3,201,353
MICRO-INCLUSIONS AND METHOD OF
MAKING SAME
Leo D. Corben, Oak Park, Mich., assignor, by mesne assignments, to American Agricultural Chemical Company, a corporation of Delaware
No Drawing. Filed June 14, 1960, Ser. No. 35,916
4 Claims. (Cl. 252—316)

This invention relates to micro-inclusions. More particularly, this invention relates to novel micro-inclusions comprising water-immiscible materials encapsulated within an encapsulating agent and to a method of preparing the same. Still more particularly, this invention relates to micro-inclusions comprising water-immiscible material encapsulated within a solid, hydrophobic complex of an organic normally hydrophilic colloid.

Micro-inclusions, i.e., materials containing oil or similar water-immiscible materal encapsulated within a substantially liquid-impermeable material, such as gelatin, are known. Micro-inclusions have been proposed for use as a coating material on transfer sheets for copying purposes and the like. Micro-inclusions have also been proposed for use as medicinal materials and pharmaceuticals, particularly when the encapsulated water-immiscible material comprises an oil solution of a vitamin or a drug. Micro-inclusions have also been proposed for the handling, dispensing and storage of materials, such as perfumes, essential oils, flavoring agents, inks, pharmaceuticals and the like, which might be subject to oxidative degradation.

Various methods have been proposed for the preparation of micro-inclusions, see U.S. Patents 2,800,457 and 2,800,458. Proposed methods have called for, in effect, forming a coating or sheath of a gellable material, such as gelatin, around oil or other water immiscible liquid to be encapsulated, and then causing the gelatin to gel or set therearound, thereby encapsulating the water-immiscible liquid within a substantially solid, liquid impermeable sheath of gelatin. The methods heretofore proposed have not been entirely satisfactory in view of the fact that careful temperature control must be maintained to prevent premature gelling of the gelatin prior to encapsulation of the water-immiscible liquid in contact therewith. Further, the proposed methods involve rather careful control of the type and compositions of the materials undergoing treatment and the actual encapsulating reaction admixture itself.

Accordingly, it is an object of this invention to provide novel micro-inclusions containing a water-immiscible material encapsulated within a sheath comprising a solid complex of an organic, normally hydrophilic colloid.

Another object of this invention is to provide a novel method of preparing micro-inclusions.

Still another object of this invention is to provide micro-inclusions comprising water-immiscible materials, such as mineral oil, or water-insoluble animal or vegetable oils or finely divided water-repellent solid material encapsulated within a substantially fluid impermeable hydrophobic sheath.

Still another object of this invention is to provide a method whereby micro-inclusions are readily and expeditiously prepared.

How these and other objects of this invention are achieved will become apparent in the light of the accompanying disclosure.

In accordance with this invention novel compositions of matter comprising a water-immiscible material encapsulated within a solid, zirconium-containing complex of an organic, normally hydrophilic colloid are prepared by forming a dispersion of water-immiscible material in an aqueous solution of an organic hydrophilic colloid and then admixing said solution with a water-soluble zirconium-containing compound to precipitate said colloid as a solid zirconium-containing complex, the resulting zirconium-containing complex, upon precipitation, encapsulating said water-immiscible material.

More particularly, in accordance with this invention, novel micro-inclusions containing a water-immiscible material encapsulated within a solid, hydrophobic sheath are prepared by forming a dispersion or emulsion of a water-immiscible material, such as lubricating oil or a water-immiscible animal or vegetable oil and the like, in an aqueous solution of an organic, normally hydrophilic colloid, such as a gelable proteinaceous hydrophilic colloid, e.g. gelatin, and thereupon admixing the resulting dispersion or emulsion with an aqueous solution of a water-soluble zirconium-containing salt to precipitate said colloid as a solid, hydrophobic zicronium-containing complex, said complex, upon precipitation, encapsulating the dispersed or emulsified water-immiscible material to form the micro-inclusions of this invention.

Although various organic hydrophilic colloids may be employed in the practice of this invention for the preparation of these micro-inclusions, it is preferred to employ gelatin as the organic, normally hydrophilic colloid from which the solid, hydrophobic zirconium-containing complexes are formed. Various types of gelatin are suitable for use in the practice of this invention including high bloom strength gelatin, i.e., gelatin having a bloom strength above 200, or relatively low bloom strength gelatin, such as gelatin having a bloom strength in the range 50–200. Indeed, in the practice of this invention degraded gelatin, i.e., which evidences substantially no bloom strength or is substantially ungelable is suitable since the derivative solid zirconium-containing complexes thereof, upon precipitation, also encapsulate dispersed water-immiscible material in contact therewith. It is desirable, however, to employ a gelable gelatin, preferably gelatin having a bloom strength above about 150, in the practice of this invention since the resulting hydrophobic zirconium-containing gelatin complex yields a mechanically stronger sheath around the encapsulated water-immiscible material.

Other organic, normally hydrophilic colloids which are suitably employed in the practice of this invention include such materials as sodium alginate, casein, gum karaya and carboxymethylcellulose. Also, other hydrophilic proteinaceous colloid materials which are suitable include such organic, normally hydrophilic colloid materials such as agar-agar, albumen and the like.

In the preparation of the solid zirconium-containing complexes employed for the formation of micro-inclusions in accordance with this invention, various water-soluble zirconium compounds or salts may be employed. Suitable water-soluble zirconium-containing compounds include zirconium lactate, zirconium oxychloride, basic zirconium acetate, zirconium sulfate as well as zirconium oxyiodide, zirconium oxybromide, zirconium nitrate, zirconium iodide and zirconium chloride. It is preferred in the practice of this invention, however, to employ as the water-soluble zirconium-containing compound a water-soluble zirconyl-containing compound, such as zirconyl sulfate, sodium zirconyl sulfate and the like. Other water-soluble zirconyl compounds in addition to those already named herein are known and are also particularly suitable for use in the practice of this invention.

Following the formation of the dispersion or emulsion of the water-immiscible material in an aqueous solution of a normally hydrophilic organic colloid which form solid, zirconium-containing complexes, it is preferred to introduce such emulsion or dispersion into direct contact with the water-soluble zirconium-containing precipitating or complex-forming agent, such as an aqueous solution thereof, while subjecting the resulting admixture to agitation or relatively violent agitation so that during the complex formation and precipitation operation there is present an excess of the zirconium-containing compound with respect to the aqueous emulsion added thereto. If desired, however, the zirconium-containing complexing compound, such as an aqueous solution thereof, can be introduced directly into contact with the dispersion of the water-immiscible material in the aqueous solution of the organic, normally hydrophilic colloid to be precipitated.

The admixing of the water-soluble zirconium-containing compound with the organic, normally hydrophilic colloid to be precipitated can take place at any suitable temperature at which these materials are thermally stable. In the instance, however, wherein a gelable, normally hydrophilic colloid, such as a gelable proteinaceous colloid, e.g., gelatin, is employed, the admixing should desirably take place at a temperature above the gelation temperature of the aqueous solution containing the gelable colloid. Colloid precipitation to form a solid, hydrophobic zirconium-containing gelatin complex in accordance with this invention has been carried out at a temperature in the range 10–75° C. more or less. The hydrophobic zirconium-containing complex which serves to encapsulate the water-immiscible material, is formed substantially instantaneously upon contact of the complexing or precipitating zirconium-containing compound with the organic, normally hydrophilic colloid capable of forming a solid, zirconium-containing complex therewith. Since the resulting formed solid zirconium-containing complex is hydrophobic in nature, upon the formation of these complexes in the presence of a dispersed or emulsified water-immiscible material, these water-immiscible materials are surrounded by and encapsulated by the formed hydrophobic complex.

During the complex formation operation with the resulting formation of the normally solid, water-soluble hydrophobic zirconium-containing complexes, it is believed that actual chemical reaction takes place between the complex zirconium-containing compound and the complexed normally hydrophilic colloid. For instance, in the case of the organic, proteinaceous, normally hydrophilic colloid, gelatin, the zirconium-containing complex formed therewith is believed to be represented by the following formula, wherein the zirconium-containing complexing agent employed is a zirconyl compound such as zirconyl sulfate.

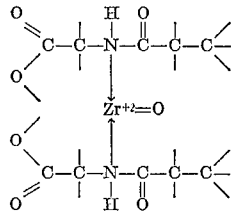

In the practice of this invention substantially any water-immiscible material may be encapsulated within the hydrophobic zirconium-containing complex. In this specification and in the accompanying claims the term "water-immiscible material" is meant to include not only the water-immiscible hydrocarbon or petroleum liquids such as mineral oil and the various petroleum fractions, e.g., gasoline, kerosene, lubricating oil, asphaltic and bituminous type materials, but also such materials as the normally water-immiscible, non-hydrocarbon liquids such as the various animal, vegetable and fish oils, lards, fats and greases, e.g. olive oil, coconut oil, soy bean oil, castor oil, sperm oil, etc., as well as such diverse materials, as the mineral greases and soaps, and such water-repellent or hydrophobic solid materials as natural and synthetic rubber latex, carbon black or an oily carbon black, finely divided metal sulfides such as lead sulfide and iron sulfide (pyrites), graphite as well as other finely dispersed hydrophobic metal particles or solids such as the silicones and derivatives thereof which are water-immiscible and/or water-repellent or hydrophobic.

The emulsified water-immiscible materials which are encapsulated in accordance with the practice of this invention to yield these novel micron-inclusions are generally of microscopic size, having an average diameter in the range 0.01–100 microns, more or less, depending upon the intensity with which the dispersion of emulsion has been prepared and the particular materials employed therein.

Reference is now made to the accompanying example as illustrative of the practice of this invention.

*Example*

Twenty grams of gelatin, a gelable hydrophilic proteinaceous colloid, were dissolved in 180 cc. of water. There was dispersed in the resulting solution about 20 grams of an oil solution containing DMR Process Cobalt, dissolved therein to the extent of about 6% by weight based on the oil solution.

There was separately prepared an aqueous solution containing 15 grams of zirconyl sulfate dissolved in 285 cc. of water. The resulting zirconyl sulfate was maintained at a temperature in the range 10–15° C. The aqueous zirconyl sulfate solution is then placed in a Waring Blendor and the blender operated.

The aqueous gelatin solution containing the oil solution dispersed therein was then added as a thin stream to the zirconyl solution being violently agitated in the blender. As the gelatin solution containing the oil dispersed therein was added a precipitate was formed with the resulting formation of a flocculent mass of capsules or micro-inclusions containing the oil solution encapsulated within the resulting precipitated hydrophobic zirconyl-containing gelatin complex. The flocculent mass of capsules was removed from the blender and washed by decantation with water at a temperature in the range 10–15° C. until the wash water was clear. The water was then drained from the flocculent mass of capsules and the mass of capsules was then distributed on a polyethylene sheet and placed in a drying oven or tunnel and air dried at a temperature of about 90–100° F. and at a relatively low humidity, not above 30%.

After the flocculent mass of capsules had been dried, the resulting dried mass was comminuted and washed with an oil solvent, such as ether, to remove any of the oil released by the capsules due to crushing during the comminution operation. It is pointed out, however, that if the flocculent mass of capsules in liquid suspension is spray dried, since little or no comminution is then required, the washing operation for the removal of oil released by the capsules during the grinding or comminution operation can be eliminated.

Following the drying operation the gelatin capsules containing the oil solution encapsulated therein can be hardened even to the point of insolubility in boiling water by contact with or by immersion in a formaldehyde solution such as a 37% by weight formaldehyde solution. If desired, this capsule hardening solution can be incorporated within the zirconyl-containing solution employed to precipitate the gelatin during the encapsulation operation and then permitting the resulting preceipitated, flocculent mass of capsules to soak therein for a sufficient period of time, such as for about 15 minutes, to effect hardening of the capsules prior to the washing operation.

When a portion of the thus-produced flocculent mass of capsules is placed under a microscope the individual capsules containing droplets of oil solution encapsulated therein are visible at magnifications of 430× and 970×. The vast majority of the capsules therein are in aggregates of individual capsules and it was noticed that when a flocculent mass of capsules are dried even larger aggregates are obtained. When these capsules are ruptured or crushed the oil solution encapsulated therein is released to treat or otherwise mark the surfaces in contact therewith.

The dried capsules or micro-inclusions can be prepared in a paste form in a suitable carrier liquid or even in the substantially dried, solid state to coat the surfaces of various materials, such as paper, wooden surfaces, metal surfaces, and the like, such that when suitably treated such as by crushing or by application of heat and/or pressure the water-immiscible material encapsulated therein is released. When the encapsulated water-immiscible material contains an adhesive, a pressure sensitive surface is provided and bonding of the coated surface to another surface can be readily effected. In the instance when the encapsulated water-immiscible material contains a dye or coloring agent, as in the foregoing example, marking or coloring of the surface in contact therewith is also readily effected.

As indicated hereinabove, micro-inclusions prepared in accordance with this invention have great utility and can be used for very many purposes such as a carrier for pharmaceuticals and medicinal agents such as vitamins, as a carrier for flavoring agents for incorporation in chewing gum and the like wherein, upon mastication and crushing of the capsules therein, flavor bodies are gradually and continually released. Capsules prepared in accordance with this invention are useful in the preparation of solids fuels, for the preparation of catalytic release agents which slowly release catalysts as materials containing these capsules are worked or treated to cause release of the catalytic agents encapsulated therein. Such materials would be useful in the rubber industry and in the chemical processing industry and allied fields.

As will be apparent to those skilled in the art in the light of the accompanying disclosure, many modifications, changes and alterations are possible in the practice of this invention without departing from the spirit of scope thereof.

I claim:
1. A method which comprises admixing at a temperature in the range from about 10° C. to about 75° C. an aqueous gelatin solution containing a water-immiscible material dispersed therein with an aqueous solution of a water-soluble zirconyl salt to precipitate said gelatin as a hydrophobic zirconyl-containing gelatin complex, said gelatin complex being formed upon admixture of said aqueous zirconyl solution and said gelatin solution and said gelatin complex upon formation encapsulating said water-immiscible liquid.

2. A method which comprises forming an oil in water dispersion, said water containing gelatin dissolved therein, introducing at a temperature in the range from about 10° C. to about 75° C. said oil in water dispersion into contact with an aqueous solution of a water-soluble zirconyl salt to form a hydrophobic zirconyl-containing gelatin complex, said gelatin complex being formed upon admixture of said water containing gelatin dissolved therein with said aqueous zirconyl solution and said zirconyl-containing gelatin complex upon formation encapsulating said oil.

3. A composition of matter consisting essentially of water-immiscible material encapsulated within a solid, hydrophobic zirconyl-containing gelatin complex.

4. A composition of matter consisting essentially of a water-immiscible liquid encapsulated within a solid, hydrophobic zirconyl-containing gelatin complex.

References Cited by the Examiner
UNITED STATES PATENTS

| 2,411,793 | 11/46 | Kennedy et al. | 106—205 XR |
| 2,567,184 | 9/51 | Corwin et al. | 260—113 XR |
| 2,721,861 | 10/55 | Paterson | 260—113 |
| 2,800,457 | 7/57 | Green et al. | 252—316 |
| 2,800,458 | 7/57 | Green | 252—316 |
| 2,805,216 | 9/57 | Keller | 260—113 |
| 2,886,446 | 5/59 | Kramer et al. | 252—316 X |
| 2,989,417 | 6/61 | Overman | 106—135 XR |

JULIUS GREENWALD, *Primary Examiner.*